(12) United States Patent
Cragel et al.

(10) Patent No.: US 11,491,867 B2
(45) Date of Patent: Nov. 8, 2022

(54) FUEL TANK ASSEMBLY AND METHOD FOR MANUFACTURE OF THE FUEL TANK ASSEMBLY

(71) Applicant: Ford Global Technologies, LLC, Dearborn, MI (US)

(72) Inventors: Daniel Frank Cragel, Livonia, MI (US); Brian Thomas Aitken, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 675 days.

(21) Appl. No.: 16/412,307

(22) Filed: May 14, 2019

(65) Prior Publication Data

US 2020/0361313 A1 Nov. 19, 2020

(51) Int. Cl.
| | |
|---|---|
| *B60K 15/067* | (2006.01) |
| *C09D 5/08* | (2006.01) |
| *C09D 175/04* | (2006.01) |
| *B60K 15/03* | (2006.01) |

(52) U.S. Cl.
CPC .......... *B60K 15/067* (2013.01); *C09D 5/08* (2013.01); *C09D 175/04* (2013.01); *B60K 2015/03046* (2013.01); *B60K 2015/03493* (2013.01)

(58) Field of Classification Search
CPC .... B60K 15/067; B60K 15/07; B60K 15/073; B60K 2001/0438
See application file for complete search history.

(56) References Cited

U.S. PATENT DOCUMENTS

| | | | | | |
|---|---|---|---|---|---|
| 4,886,180 | A | * | 12/1989 | Bonczyk | B60K 15/067 220/651 |
| 5,445,351 | A | * | 8/1995 | Foster | B60K 15/067 280/834 |
| 5,658,013 | A | * | 8/1997 | Bees | B60K 15/03 280/834 |
| 5,810,309 | A | * | 9/1998 | Augustine | B60K 15/07 248/154 |
| 6,378,823 | B1 | * | 4/2002 | Edholm | B60K 15/067 248/230.8 |
| 8,972,152 | B2 | | 3/2015 | Boesch | |
| 9,279,055 | B2 | | 3/2016 | Schroeder et al. | |
| 9,579,972 | B2 | * | 2/2017 | Taniguchi | B60K 15/067 |
| 2004/0160052 | A1 | * | 8/2004 | Marsala | B60K 15/01 280/834 |
| 2008/0284152 | A1 | * | 11/2008 | Levin | B60K 15/067 248/316.1 |
| 2009/0309000 | A1 | * | 12/2009 | Guckes | B60K 15/07 248/309.1 |
| 2014/0103628 | A1 | * | 4/2014 | De Biasi | B60K 15/067 280/834 |

(Continued)

*Primary Examiner* — Jeffrey J Restifo
(74) *Attorney, Agent, or Firm* — Vincent Mastrogiagomo; McCoy Russell LLP

(57) ABSTRACT

A system and method for manufacture of the system are provided. In one example, the system comprises a first component, a second component securing the first component to a portion of the system, and a flexible strip with an abrasion resistant coating including a copolymer. The first component or the second component includes a corrosion coating on an exterior surface and the flexible strip is interposed between a surface of the first or second component and the corrosion coating.

15 Claims, 6 Drawing Sheets

(56) References Cited

U.S. PATENT DOCUMENTS

| | | | |
|---|---|---|---|
| 2015/0144642 A1* | 5/2015 | Bruns | B62D 27/06 |
| | | | 220/562 |
| 2016/0039282 A1* | 2/2016 | Mathew | B60K 15/067 |
| | | | 248/313 |
| 2016/0082910 A1* | 3/2016 | Sloan | B60K 15/063 |
| | | | 293/128 |
| 2017/0267121 A1* | 9/2017 | Kotik | H01M 50/20 |
| 2018/0123102 A1* | 5/2018 | Lomax | H01M 50/20 |
| 2019/0256345 A1* | 8/2019 | Wetzel | B67D 7/421 |
| 2020/0361313 A1* | 11/2020 | Cragel | C09D 5/08 |
| 2021/0362206 A1* | 11/2021 | List Clausen | B60K 15/067 |

* cited by examiner

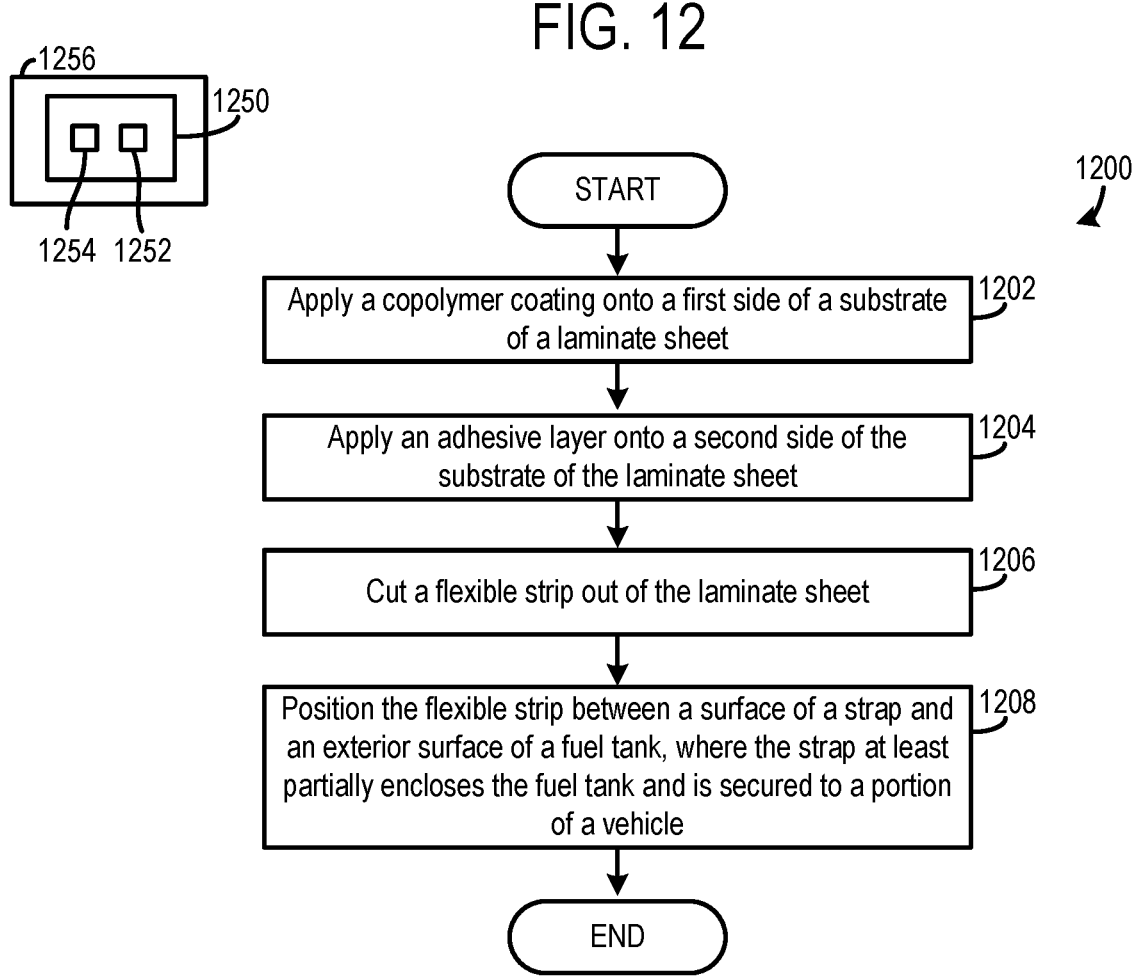

FUEL TANK ASSEMBLY AND METHOD FOR MANUFACTURE OF THE FUEL TANK ASSEMBLY

FIELD

The present description relates generally to a fuel tank assembly and a method for manufacture of a fuel tank assembly.

BACKGROUND/SUMMARY

Fuel tanks providing fuel to internal combustion engines are commonly attached to an underside of a vehicle, such as at a location along the frame. Straps or other attachment mechanisms are used to secure the tank to the vehicle frame, typically at a location spaced away from the engine compartment. Weight distribution, safety, etc., are taken into account when designing the fuel tank assembly. Metals, polymers such as high-density polyethylene (HDPE), etc., are typically utilized in fuel tank construction. In the case of certain metal fuel tank designs, corrosion coating is applied to the housing of the fuel tank to decrease the likelihood of tank degradation.

U.S. Pat. No. 9,279,055 B2 to Schroeder et al. discloses a fuel tank with a chromate free corrosion coating. In Schroeder, the coating, which may include polyurea, is sprayed, brushed, or rolled onto an outer layer of tank. The inventors however, have recognized several drawbacks with the fuel tank disclosed in Schroeder. One such drawback is increased fuel tank cost caused by the corrosion coating application methods. For instance, the application of the corrosion coating on the exterior of the fuel tank, may necessitate the transport of the fuel tank to a specialized facility for coating application remote from the vehicle manufacturing facility. Transport of the fuel tank between the manufacturing facilities may not only be costly but is also time consuming, resulting in increased vehicle manufacturing costs. Additionally, in some circumstances the fuel tank may only have specific wear areas caused by vehicle movement. Coating the entire tank with a polyurea coating in these circumstances may therefore be superfluous. It will be understood that the problem of overabundant polyurea coating application may be encountered in other vehicle components, such as batteries and straps or other components secured to the vehicle as well as fields outside the automotive industry such as the aerospace industry, construction, manufacturing, etc.

In one example, to at least partially address the aforementioned problems, a system is provided. The system comprises a first component, a second component securing the first component to a portion of the system, and a flexible strip with an abrasion resistant coating including a copolymer. The first or second component includes a corrosion coating on an exterior surface. Additionally, the flexible strip is interposed between a surface of the first or second component and the corrosion coating. In this way, an abrasion resistant copolymer is applied to selected portions of the interface between two components where wear is expected. By providing an abrasion resistant copolymer on an adhesively backed strip, the abrasion resistant coating can be placed in targeted regions of the components without spraying or otherwise applying the abrasion resistant coating on other unnecessary locations on the components, if desired. For example, the copolymer strip may be localized in areas where the first component and the second component are expected to rub during system operation. As a result, system manufacturing costs are reduced via an efficient use of the abrasion resistant polymer.

In one example, the first component may be a fuel tank and the second component may be a strap securing the fuel tank to a portion of a vehicle. It will be appreciated that efficient application of the flexible strips on the fuel tank or strap can be achieved due to the application of the strips at a vehicle manufacturing facility while the fuel tank is installed in the vehicle, for example. Consequently, manufacturing costs of the vehicle are reduced.

In one example, the copolymer may include polyurea. It will also be appreciated that a polyurea coating increases the amount of corrosion protection and abrasion resistance on the exterior of the first component thereby increasing system durability.

Further, in one example, the first component may be a fuel tank in a vehicle and the second component may be a strap. In such an example, the flexible strip may include a substrate with a first side having adhesive backing and a second side with the abrasion resistant coating. In this way, the strip maybe efficiently manufactured prior to tank assembly in the vehicle and then efficiently applied to the interface between the components at a favorable time during fuel delivery system installation in the vehicle, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 12 shows a manufacturing method for a system.

FIGS. 2-11 are shown approximately to scale. However, other relative dimensions may be used, in other embodiments.

DETAILED DESCRIPTION

A flexible strip with an abrasion resistant coating, such as polyurea, on one side and adhesive on an opposing side is described herein. The abrasion resistant flexible strip may be located at the interface between two components in a system. For instance, the abrasion resistant flexible strip may be positioned between the fuel tank and a strap securing the tank to a section of a vehicle, in one example. However, in other examples, the abrasion resistant flexible strip may be used in other locations in the vehicle. For instance, the flexible strip may be positioned between an exterior surface of a battery and a strap or other component securing the battery to the vehicle. In yet another example, a flexible strip may be positioned on a filler neck of the fuel tank, on a battery tray, etc. In other examples, flexible strips may be used in fields outside the automotive industry, such as at component interfaces in aerospace applications, manufacturing applications, maritime applications, etc. In the automotive example, positioning the abrasion resistant coating between the attachment strap and the tank housing decreases abrasive wear caused by repeated micro-movements between the tank and the strap during vehicle operation. Consequently, the fuel tank's longevity is increased. It will also be appreciated that by using the flexible strip in the tank assembly the adaptability of the manufacturing process is increased. Increasing manufacturing adaptability allows more cost efficient manufacturing techniques to be employed, if desired, when compared to previous techniques requiring the tank to be transported to a separate facility to apply a protective coating. In one example, the flexible strip may be cut out of a previously manufactured sheet. Significant cost savings can be realized when a sheet with a coat of polyurea or other copolymer coating is applied to a substrate with an adhesive backing when compared to manufacturing techniques where polyurea is sprayed onto the fuel tank or strap. For example, in previous tank constructions, when polyurea is sprayed on a tank housing, a large amount of polyurea may be unnecessarily applied on the fuel tank in low wear regions. However, the fuel tank assembly described herein allows the abrasive resistant coating to be localized in areas of the tank or strap expected to experience significant wear during vehicle operation, for example.

Figure 1:
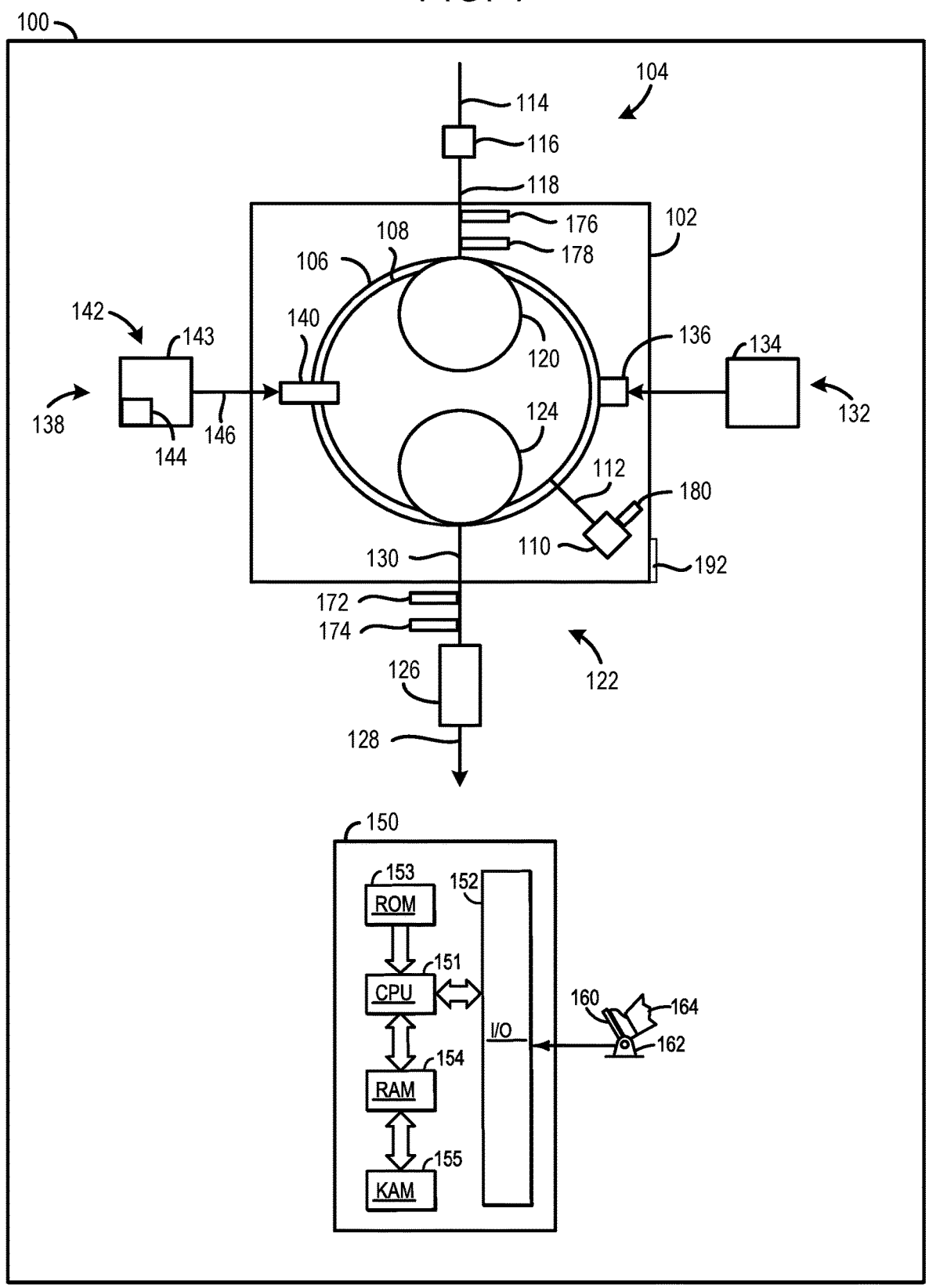
FIG. 1 shows a schematic illustration of a vehicle with a fuel delivery system.
Figure 2:
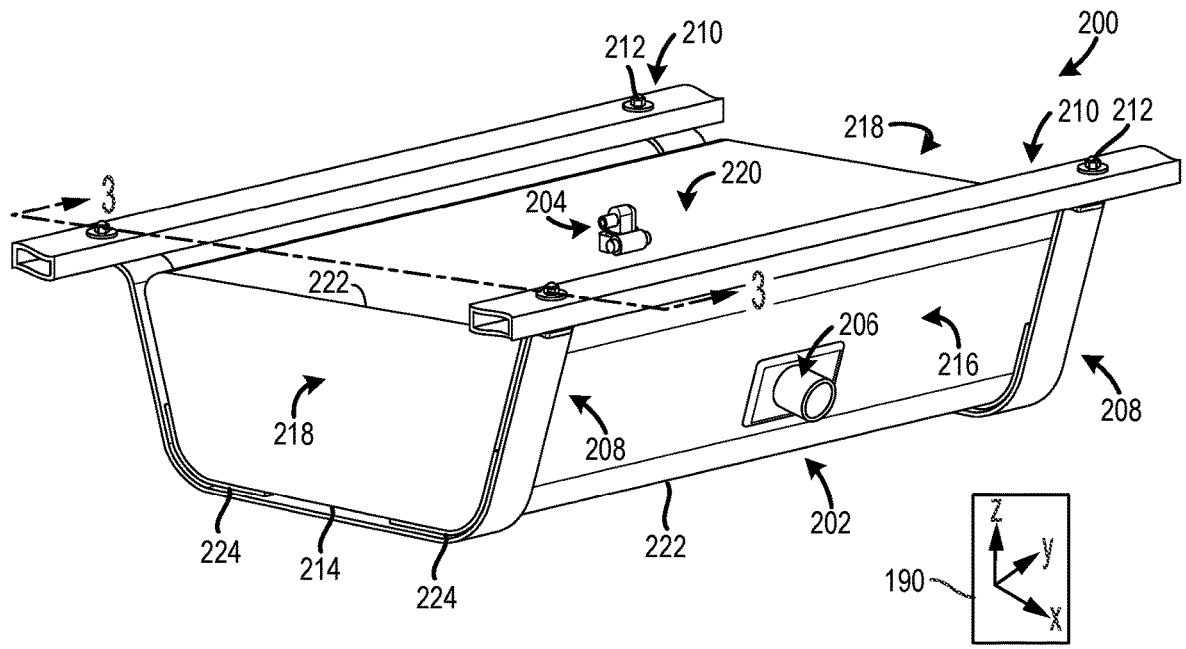
FIG. 2 shows a perspective view of an example of a fuel tank assembly.
Figure 3:
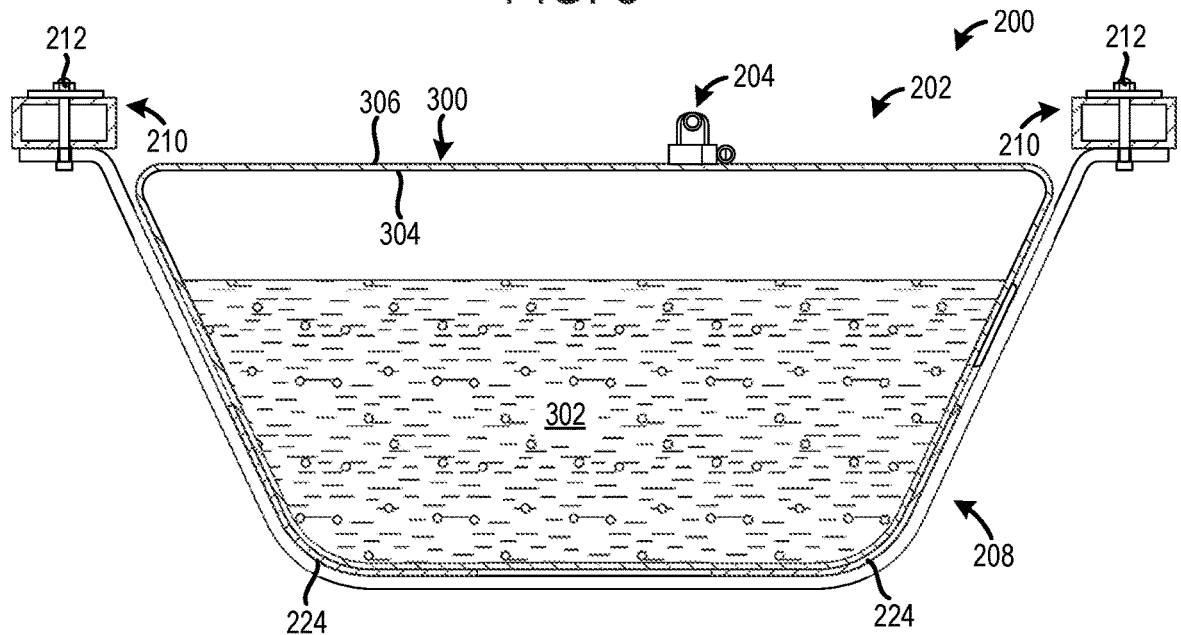
FIG. 3 shows a cross-sectional view of the fuel tank assembly, shown in FIG. 2.
Figure 4:
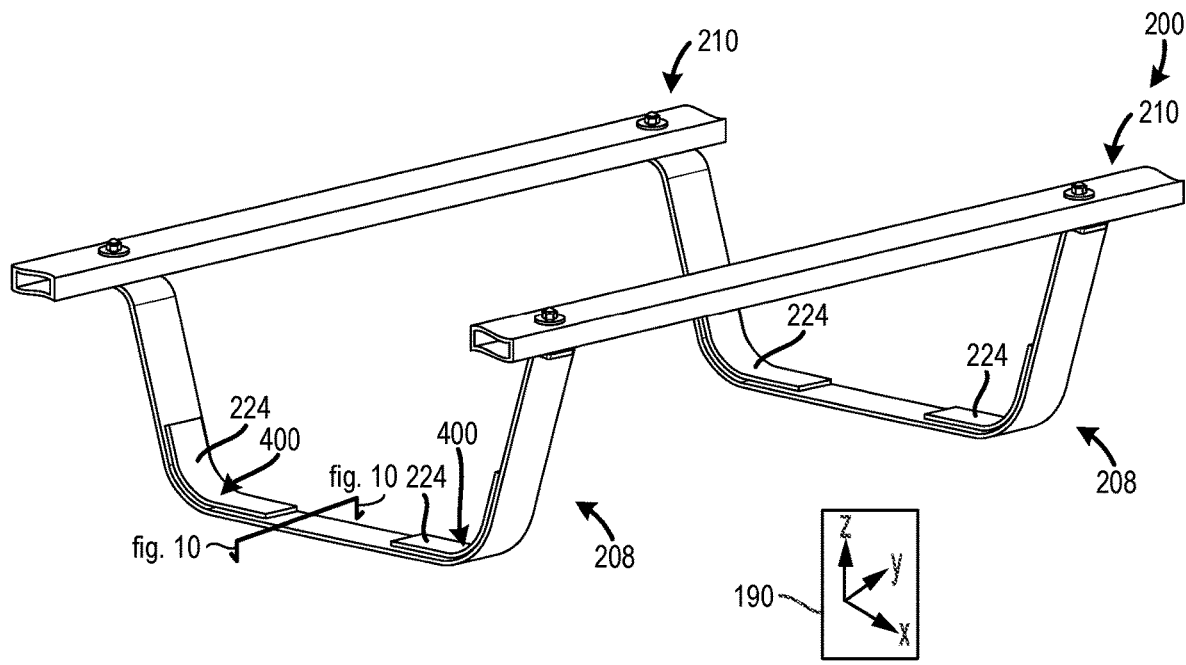
FIG. 4 shows an illustration of the fuel tank assembly, depicted in FIG. 2, with the fuel tank removed to reveal underlying sections of straps in the assembly.
Figure 5:
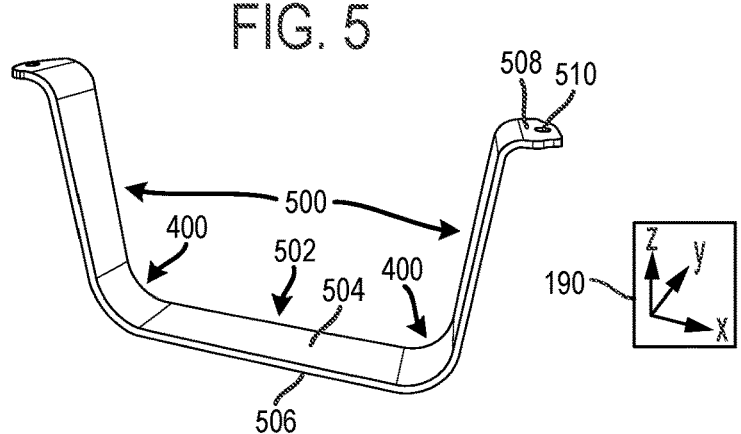
FIGS. 5-6 show a sequence in which a flexible strip with an abrasion resistant coating is applied to one of the straps, shown in FIG. 4.
Figure 6:
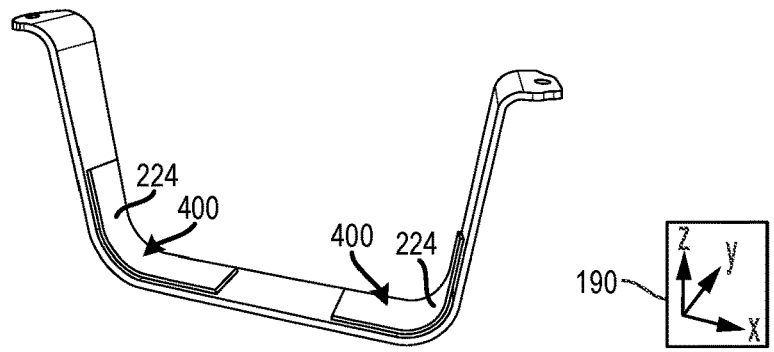
Figure 7:
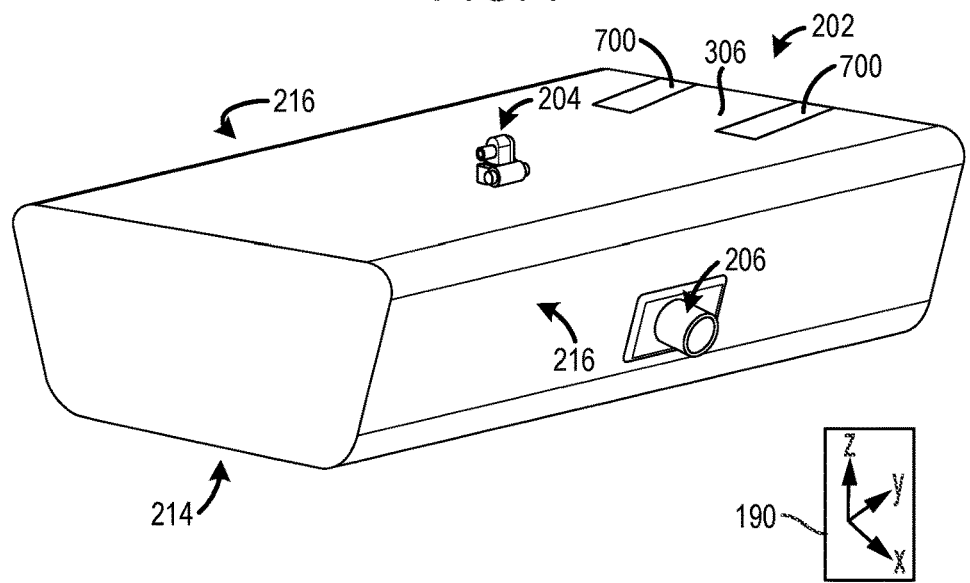
FIG. 7 shows a detailed illustration of the fuel tank, shown in FIG. 2.
Figure 8:
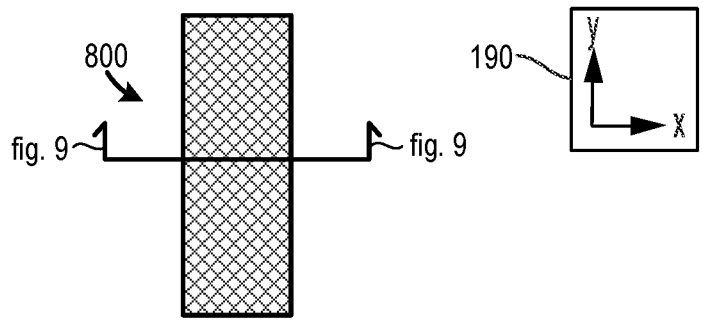
FIG. 8 shows an illustration of a flexible strip including an abrasion resistant coating and an adhesive coating.
Figure 9:
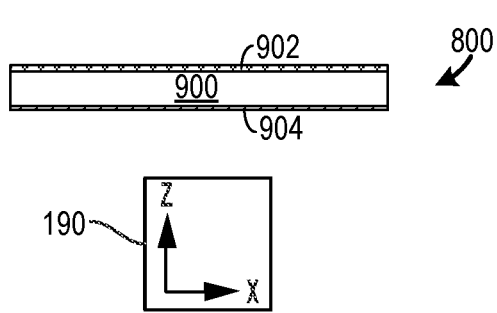
FIG. 9 shows a cross-sectional view of the flexible strip, illustrated in FIG. 8.
Figure 10:
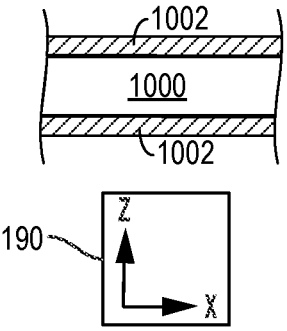
FIG. 10 shows a cross-sectional view of one of the straps, shown in FIG. 2.
Figure 11:
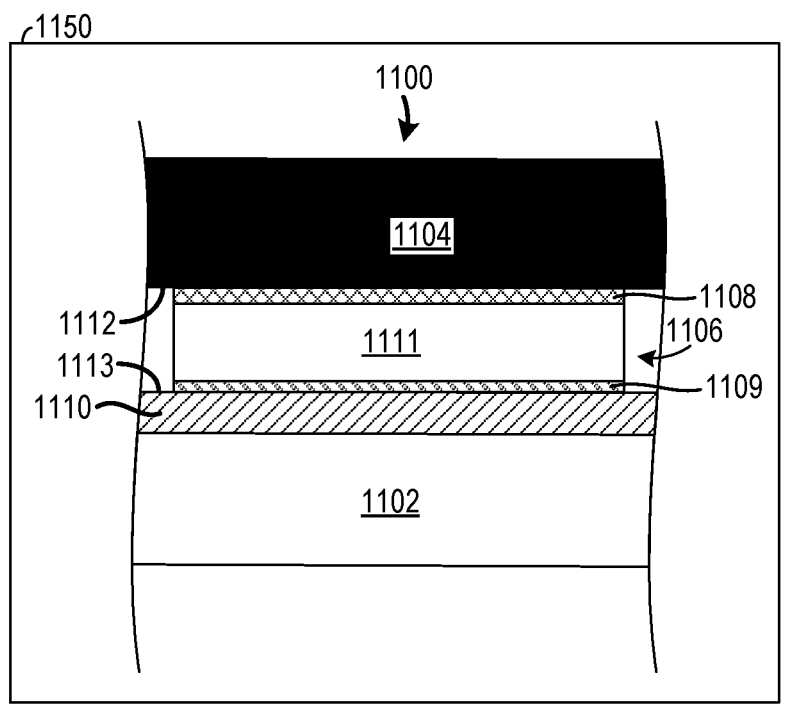
FIG. 11 shows an example of a system using a flexible strip with an abrasion resistant coating positioned at an interface between the two components.

FIG. 1 shows a schematic illustration of a vehicle with an engine fuel tank assembly. FIG. 2 shows an example of the engine fuel tank assembly. FIG. 3 shows a cross-section of the engine fuel tank assembly, depicted in FIG. 2. FIG. 4 shows a view of the engine fuel tank assembly, shown in FIG. 2, with the fuel tank omitted to reveal underlying components. FIGS. 5-6 show a detailed illustration of a sequence where flexible strips including an abrasion resistant coating are applied to straps attaching the fuel tank to a vehicle frame. FIG. 7 shows a detailed view of the fuel tank, shown in FIG. 2. FIGS. 8-9 show detailed illustrations of an example of a flexible strip with an abrasion resistant coating. FIG. 10 shows a cross-sectional view of one of the straps, shown in FIG. 4. FIG. 11 shows a system with two components having a flexible strip with an abrasion resistant coating positioned at an interface between the two components. FIG. 12 shows a method for manufacture of a system (e.g., engine fuel tank assembly).

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1. Specifically, the fuel tank assembly 142 shown in FIG. 1 has greater structural complexity than is depicted in FIG. 1. Examples of the structural features of the fuel tank assembly are illustrated in FIGS. 2-10 and described in greater detail herein.

An intake system 104 providing intake air to a cylinder 106, is also depicted in FIG. 1. It will be appreciated that the cylinder may be referred to as a combustion chamber. A piston 108 is positioned in the cylinder 106. The piston 108 is coupled to a crankshaft 110 via a piston rod 112 and/or other suitable mechanical component. It will be appreciated that the crankshaft 110 may be coupled to a transmission that provides motive power to a drive wheel. Although, FIG. 1 depicts the engine 102 with one cylinder, the engine 102 may have additional cylinders, in other examples. For instance, the engine 102 may include a plurality of cylinders that may be positioned in banks.

The intake system 104 includes an intake conduit 114 and a throttle 116 coupled to the intake conduit. The throttle 116 is configured to regulate the amount of airflow provided to the cylinder 106. For instance, the throttle 116 may include a rotatable plate varying the flowrate of intake air passing there through. In the depicted example, the throttle 116 feeds air to an intake conduit 118 (e.g., intake manifold). In turn, the intake conduit 118 directs air to an intake valve 120. The intake valve 120 opens and closes to allow intake airflow into the cylinder 106 at desired times. The intake valve 120, may include, in one example, a poppet valve with a stem and a valve head seating and sealing on a cylinder port in a closed position.

Further, in other examples, such as in a multi-cylinder engine additional intake runners may branch off the intake conduit 118 and feed intake air to other intake valves. It will be appreciated that the intake conduit 118 and the intake valve 120 are included in the intake system 104. Moreover, the engine 102, shown in FIG. 1, includes one intake valve and one exhaust valve. However, in other examples, the cylinder 106 may include two or more intake and/or exhaust valves.

An exhaust system 122 configured to manage exhaust gas from the cylinder 106 is also included in the vehicle 100, depicted in FIG. 1. The exhaust system 122 includes an exhaust valve 124 designed to open and close to allow and inhibit exhaust gas flow to downstream components from the cylinder. For instance, the exhaust valve may include a poppet valve with a stem and a valve head seating and sealing on a cylinder port in a closed position.

The exhaust system 122 also includes an emission control device 126 coupled to an exhaust conduit 128 downstream of another exhaust conduit 130 (e.g., exhaust manifold). The emission control device 126 may include filters, catalysts, absorbers, combinations thereof, etc., for reducing tailpipe emissions. The engine 102 also includes an ignition system 132 including an energy storage device 134 designed to provide energy to an ignition device 136 (e.g., spark plug). For instance, the energy storage device 134 may include a battery, capacitor, flywheel, etc. Additionally or alternatively, the engine 102 may perform compression ignition. Therefore, in one example, the ignition system 132 may be omitted from the engine.

FIG. 1 also shows a fuel delivery system 138. The fuel delivery system 138 provides pressurized fuel to a fuel injector 140. In the illustrated example, the fuel injector 140 is a direct fuel injector coupled to cylinder 106. Additionally or alternatively, the fuel delivery system 138 may also include a port fuel injector designed to inject fuel upstream of the cylinder 106 into the intake system 104. For instance, the port fuel injector may be an injector with a nozzle spraying fuel into an intake port at desired times. The fuel delivery system 138 includes a fuel tank assembly 142 with a fuel tank 143. The fuel delivery system 138 also includes a fuel pump 144 designed to flow pressurized fuel to downstream components. For instance, the fuel pump 144 may be an electric pump with a piston and an inlet in the fuel tank that draws fuel into the pump and delivers pressurized fuel to downstream components. However, other suitable fuel pump configurations have been contemplated. Furthermore, the fuel pump 144 is shown positioned within the fuel tank 143. Additionally or alternatively the fuel delivery system may include a second fuel pump (e.g., higher pressure fuel pump) positioned external to the fuel tank. A fuel line 146 provides fluidic communication between the fuel pump 144 and the fuel injector 140. The fuel delivery system 138 may include additional components such as a higher-pressure pump, valves (e.g., check valves), return lines, etc., to enable the fuel delivery system to inject fuel at desired pressures and time intervals. FIG. 1 also shows a flexible strip 192 with an abrasion resistant coating coupled to the engine 102. The characteristics of the flexible strip are described in greater detail herein.

During engine operation, the cylinder 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

FIG. 1 also shows a controller 150 in the vehicle 100. Specifically, controller 150 is shown in FIG. 1 as a conventional microcomputer including: microprocessor unit 151, input/output ports 152, read-only memory 153, random access memory 154, keep alive memory 155, and a conventional data bus. Controller 150 is configured to receive various signals from sensors coupled to the engine 102. The sensors may include exhaust gas composition sensor 172, exhaust gas airflow sensor 174, an intake airflow sensor 176, manifold pressure sensor 178, engine speed sensor 180, etc. Additionally, the controller 150 is also configured to receive throttle position (TP) from a pedal position sensor 162 coupled to a pedal 160 actuated by an operator 164.

Additionally, the controller 150 may be configured to trigger one or more actuators and/or send commands to components. For instance, the controller 150 may trigger adjustment of the throttle 116, fuel injector 140, fuel pump 144, etc. Specifically in one example, the controller 150 may send signals to an actuator in the fuel pump 144 to induce fuel pump outflow adjustment. Furthermore, the controller 150 may be configured to send control signals to actuators in the fuel pump 144 and the fuel injector 140 to control the amount and timing of fuel injection provided to the cylinder 106. The controller 150 may also send control signals to the throttle 116 to vary engine speed. The other adjustable components receiving commands from the controller may also function in a similar manner. Therefore, the controller 150 receives signals from the various sensors and employs the various actuators to adjust engine operation based on the received signals and instructions stored in memory (e.g., non-transitory memory) of the controller.

FIG. 2 shows a perspective view of an example of a fuel tank assembly 200. The fuel tank assembly 200 includes a fuel tank 202 storing a fuel. The fuel may be delivered to downstream components, such as a fuel injector (e.g., fuel injector 140, shown in FIG. 1). The fuel tank 202 includes an outlet 204 which may be coupled to downstream components and a fill tube 206 facilitating tank refill. It will be appreciated that the outlet 204 may be coupled to an in-tank fuel pump. Additionally, the fill tube 206 may be in fluidic communication with a vehicle fill port. However, other fuel delivery system designs have been contemplated.

Straps 208 are shown securing the fuel tank 202 to vehicle frame rails 210. The vehicle frame rails 210 are shown extending in a longitudinal direction. However, frame rails with other contours have been contemplated. In other examples, the straps 208 may be coupled to other suitable portions of the vehicle such as vehicle panels, other frame components, bumper rails, etc. Two straps are shown in the illustrated embodiment. However, fuel tank assemblies with a single strap or more than two straps may be used, in other examples. Furthermore, the straps 208 shown in FIG. 2 have a similar geometric profile. However, straps with varying contours may be used in other examples. It will be appreciated the straps may be contoured to conform to the fuel tank housing to support the housing.

Attachment apparatuses 212 (e.g., bolts, screws, clamps, welds, etc.,) are used to attach the straps 208 to the vehicle frame rails 210. When bolts, screw, etc., are employed the fuel tank 202 is removably attached to the vehicle frame rails 210 facilitating efficient tank removal.

The straps 208 at least partially surround an exterior of the fuel tank 202. In this way, the fuel tank 202 is structurally supported by the straps 208. Specifically, in the illustrated example, each of the straps 208 extends across a lower side 214 of the fuel tank 202 an up two lateral sides 216 of the fuel tank 202. However, other strap contours may be used, in other embodiments. For instance, the straps may also extend around a top surface of the fuel tank, in one example, or in another example, the straps may only extend across the bottom surface and a single side surface.

The fuel tank 202 also includes longitudinal sides 218 and a top side 220. The junctions of the sides 214, 216, and 218, form edges 222. It will be appreciated that each of the sides includes an interior surface and an exterior surface. It will be appreciated that the specific geometric shape of the fuel tank 202 shown in FIG. 2 is exemplary in nature and that fuel tanks with different shapes have been envisioned. For instance, the fuel tank may be a saddle type fuel tank. More generally, the fuel tank may be contoured to conform to portions of the vehicle such that the fuel tank is compactly integrated into the vehicle, in some examples.

The straps 208 may be manufactured out of suitable materials such as metal, polymers, composites, combinations thereof. Specifically, in one example, the straps 208 may be constructed out of metal (e.g., aluminum, steel, titanium, etc.,) and/or may include a corrosive coating such as an electrophoretic paint. However, other suitable coatings have been envisioned. Additionally, when the straps are constructed out of metal they may be substantially rigid. However, in other examples, the straps may have greater flexibility.

Additionally, the fuel tank 202 may be constructed out of metal(s), polymeric material(s), composites, combinations thereof. In one example, the fuel tank 202 may be constructed out of a polymeric material such as high density polyethylene (HDPE). However, in other examples, the fuel tank may be constructed out of metal and in such an example, the tank may include a corrosive coating such as electrophoretic paint.

The fuel tank 202 and/or the straps 208 have flexible strips 224 applied on targeted sections expected to experience wear (e.g., abrasive wear). For example, micro-movements may occur between the fuel tank and the straps during vehicle operation due to road surface variations. The flexible strips 224 are also shown interposed between the fuel tank 202 and the straps 208. Positioning the strips in this way reduces abrasive wear between the straps 208 and the fuel tank 202. Specifically, in the illustrated example, the flexible strips 224 extend across an edge formed between lateral sides 216 and the lower side 214 of the fuel tank 202. However, other suitable strip locations, contours, etc., have been contemplated.

References axes 190 are provided in FIGS. 1-10 for reference. In one example, the z-axis may be a vertical axis (e.g., an axis parallel to a gravitational axis), the x-axis may be a lateral axis, and the y-axis may be a longitudinal axis. However, other orientations of the axes have been contemplated.

FIG. 3 shows a cross-sectional view of the fuel tank assembly 200, illustrated in FIG. 1. Again, the fuel tank 202, straps 208, and vehicle frame rails 210 are illustrated. Additionally, the flexible strips 224 are shown positioned between the straps 208 and the fuel tank 202, to reduce abrasive wear therebetween. The flexible strips 224 include an abrasion resistant coating as well as an adhesive coating. The abrasion resistant coating and the adhesive coating are positioned on opposing sides of the strip, in one example. In another example, the abrasion resistant coating may be included on both sides and the strip and the adhesive may be applied on top of the abrasion resistant coating on one side of the strip. The abrasion resistant coating may include polyurea, polyurethane, combinations thereof, etc. A detailed illustration of the layers of the strips is shown in FIG. 9, described in greater detail herein. An abrasion resistant coating may be a coating whose material properties decrease the chance of abrasive wear (e.g., scuffing, scratching, wearing down, marring, rubbing away, etc.) The abrasion resistance of the coating may be measured using International Organization for Standardization (ISO) tests such as the ISO 9352, ISO 23794, and/or ISO 4649.

The fuel tank 202 is shown with a housing 300 containing a fuel 302 (e.g., gasoline, diesel, biodiesel, alcohol (e.g., ethanol, methanol, etc.,), combinations thereof, compressed natural gas (CNG), etc. The housing 300 includes an interior surface 304 and an exterior surface 306.

The frame rails 210 are shown coupled to the straps 208 via attachment apparatuses 212 extending through openings in the frame rails 210 and the straps 208. The attachment apparatuses 212, in the illustrated example, are nuts, bolts, and washers. However, numerous suitable attachment apparatuses have been contemplated, such as screws, clamps, adhesive, welds, etc.

The outlet 204 of the fuel tank 202 is again shown. It will be appreciated that the fuel tank may also include a pick-up tube and fuel pump to which the outlet is attached.

FIG. 4 shows the fuel tank assembly 200 with the fuel tank removed to reveal the underlying contours of the straps 208 and the flexible strips 224. The straps 208 are again shown coupled to the vehicle frame rails 210. As shown, the flexible strips 224 are shown positioned at interior corners 400 of the straps 208. As such, the strips are spaced away from one another. In this way, the strips, designed to reduce abrasive wear between the fuel tank and straps, can be positioned in targeted locations to prevent extraneous strap material from being used in the fuel tank assembly, if desired. The cutting plane corresponding to the cross-sectional view depicted in FIG. 10 is illustrated in FIG. 4.

FIGS. 5-6 show a manufacturing sequence where flexible strips are applied to one of the straps 208. Specifically, FIG. 5 shows the strap 208 prior to the application of the flexible strips. The strap 208 includes two side sections 500 and a lower section 502. The intersections between the side sections 500 and the lower section 502 form the interior corners 400. The strap 208 also includes an inner surface 504 adjacent to the fuel tank housing, when the assembly is installed, and an outer surface 506. FIG. 5 also shows flanges 508 including openings 510 allow the straps to be attached to the vehicle frame rail.

FIG. 6 shows the flexible strips 224 attached to the interior corners 400 and spaced away from one other. In this way, abrasion resistance in the assembly can be localized in higher wear areas, for example.

FIG. 7 shows a detailed view of the fuel tank 202. The outlet 204 and the fill tube 206 in the fuel tank are again shown. It will be appreciated that in other examples, flexible strips with an abrasion resistant coating may be applied to exterior surfaces of the fuel tank 202 such as locations along the lateral sides 216 and/or the lower side 214. Flexible strips 700 are also shown adhesively attached to the exterior surface 306 of the fuel tank 202. The flexible strips 700 may be located in regions of the tank expected to experience abrasive wear. The flexible strips 700 have an abrasion resistant coating on an external side and an adhesive layer on an internal side, similar to the other flexible strips, described herein. Therefore, redundant description is omitted for brevity. It will be understood that the fuel tank may include flexible strips at other locations such as the filler neck of the fill tube 206.

FIG. 8 shows an example of a flexible strip 800. The flexible strip 800 is an example of one of the flexible strips 224, shown in FIGS. 2-4 and FIG. 6. The flexible strip 800 has a rectangular profile, in the illustrated example. However, it will be understood that the strip's contour may be chosen based on the end-use environment and therefore may have numerous suitable profiles such as a curved shape, convex or concave contours, other polygonal shapes, etc. Viewing plane corresponding to the cross-section of FIG. 9 is illustrated in FIG. 8.

FIG. 9 shows a cross-sectional view of the flexible strip 800. The flexible strip 800 includes a substrate 900 with an abrasion resistant coating (e.g., polyurea) 902 on one side and an adhesive coating 904 on another side. In the depicted example, the substrate has a greater thickness than the abrasion resistant coating and the adhesive coating. However, in other examples, the substrate may have a thickness that is equal to or less than the abrasion resistant coating and/or the adhesive. Additionally, the abrasion resistant coating is shown having a greater thickness than the adhesive coating. However, in other examples, the thickness of the abrasion resistant coating may be equal to or less than the thickness of the adhesive coating. In one example, the adhesive coating may be a peel and stick type adhesive. For instance, a removable layer may be placed on the adhesive. At the time of application of the strip onto the tank or strap, the layer is removed. However, in other examples, the layer adhesive may be applied to the substrate or the strap surface when the strip is positioned in the fuel tank assembly. It will be appreciated that when the abrasion resistant coating (e.g., polyurea) is provided on a flexible strip the polyurea application process may be made portable, thereby increasing the adaptability of the manufacturing procedure of the assembly.

FIG. 10 shows a cross-sectional view of one of the straps 208. As shown in FIG. 10, a base material 1000 is coated on both sides with a corrosion coating 1002 (e.g., electrophoretic paint). However, in other examples, the corrosion coating may be applied to a single side of the base material. As previously discussed, the base material may include metal, in one example. It will be understood that the fuel tank may additionally or alternatively be coated with a corrosion coating on an exterior surface, similar to the corrosion coating shown in FIG. 10.

FIG. 11 shows a cross-sectional view of a system 1100 with a first component 1102 and a second component 1104 with a flexible strip 1106 having an abrasion resistant coating 1108 and an adhesive layer 1109 on a substrate 1111. The system may be an engine system in a vehicle, a battery system in a vehicle, an engine system in a watercraft, a building system, etc. In one example, the first component may be a battery and the second component may be a strap. In another example, the first component may be a battery tray and the second component may be a strap. In another example, the first component may be a fuel tank and the second component may be a strap. In yet another example, the first component may be an engine component, in an engine compartment for instance, and the second component may be an attachment apparatus coupled to the engine compartment. The system 1100 may be included in a vehicle 1150, in one example. The abrasion resistant coating 1108 may include a copolymer such as polyurea, as previous discussed. Additionally, the adhesive layer 1109 may include the types of adhesives discussed with regard to the other flexible strips described herein. The flexible strip 1106 is shown arranged between the first component 1102 and the second component 1104. The first component includes a corrosion coating 1110, in the illustrated example. The adhesive layer 1109 is adhesively attached to an outer surface 1113 of the corrosion coating 1110, in the depicted example. However, in other examples, the second component 1104 may additionally or alternatively include a corrosion coating on the surface 1112. The abrasion resistant coating 1108 is in face sharing contact with the surface 1112 of the second component 1104. Again, the flexible strip allows for abrasive wear caused by micro-movements between the first and second components to be reduced. Moreover, the use of flexible strips allows the abrasive wear reduction to be localized in targeted spots of the components and allows the flexible strip to be applied to the components at a variety of steps on a manufacturing process. The strip application is therefore made more portable.

FIGS. 2-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 12 shows a method 1200 for manufacture of a system. The method may be implemented at least partially using a controller 1250 with instructions stored in non-transitory memory 1252 executable by a processor 1254. The controller may be included in one or more suitable manufacturing apparatuses 1256 such spray applicators, adhesive applicators, die cutting presses, etc. Additionally or alternatively, at least some of the steps may be performed via factory personnel. It will be appreciated that in one example, the method 1200 may be used to manufacture an engine fuel tank assembly. However, in other examples, the method may be used to manufacture other systems employing flexible strips with abrasion resistant coatings.

At 1202 the method includes applying a copolymer coating onto a first side of a substrate of a laminate sheet. As previously discussed, the copolymer may include polyurea, in one example. In one example, the copolymer coating may be sprayed onto the substrate. In this way, the polyurea may be efficiently applied to the sheet. However, in other examples, the coating may be applied to the substrate by dipping the sheet in a liquid polyurea solution. In such an example, a single side of the sheet may be dipped into the polyurea, in one instance. However, in other instances, both sides of the sheet may be dipped into the polyurea solution.

At 1204 the method includes applying an adhesive layer onto a second side of the substrate of the laminate sheet.

At 1206 the method includes cutting a flexible strip out of the laminate sheet. In one example, cutting the flexible strip from the laminate sheet includes die cutting the flexible strip from the laminate sheet. For instance, a die cutting press utilizing hydraulic, mechanical, and/or pneumatic mechanisms for cutting one or more flexible strips from the sheet may be employed in the manufacturing process. Fashioning flexible strips in this manner increases the portability of the abrasion resistant coating and therefore allows for greater adaptability in the system's manufacturing process.

Next at 1208 the method includes positioning the flexible strip between a surface of a first component and an exterior surface of a second component. The first component may be a strap secured to a portion of a vehicle and the second component may be a fuel tank. As previously discussed, the strap may at least partially enclose the fuel tank and may be secured to a portion of a vehicle, such as a vehicle frame rail. In the automotive example, method 1200 allows the flexible strips to be efficiently manufactured and integrated into the fuel tank assembly during vehicle manufacturing, thereby decreasing vehicle manufacturing costs and increasing fuel tank durability.

The technical effect of positioning flexible strips with an abrasion resistant coating between two components in a system is to decrease abrasive wear on the components in an efficient manner. For example, the flexible strips may be applied to targeted locations on the components to decrease wear in locations where the tank and strap are expected to experience increased wear. Consequently, the abrasion resistant coating may not be included at locations of the components not expected to experience a significant amount of wear, if desired.

The invention will be further described in the following paragraphs. In one aspect, a system is provided that comprises a first component; a second component securing the first component to a portion of the system; and a first flexible strip with an abrasion resistant coating including a copolymer; where the first component and/or the second component includes a corrosion coating on an exterior surface; and where the first flexible strip is interposed between a surface of the second component and the corrosion coating.

In another aspect, a method for constructing an engine fuel tank assembly is provided that comprises: applying a copolymer coating onto a first side of a substrate of a laminate sheet; applying an adhesive layer onto a second side of the substrate of the laminate sheet; cutting a flexible strip out of the laminate sheet; and positioning the flexible strip between a surface of a strap and an exterior surface of a fuel tank; where the strap at least partially encloses the fuel tank and is secured to a portion of a vehicle; and where at least one of the strap and the fuel tank includes a corrosion coating. In one example, cutting the flexible strip from the laminate sheet may include die cutting the flexible strip from the laminate sheet. In another example, applying the copolymer coating onto the first side of the substrate includes spraying a liquid polyurea onto the first side of the substrate. In yet another example, applying the copolymer coating onto the first side of the laminate sheet may include dipping the first side of the substrate into a liquid polyurea solution. In an additional example, the abrasion resistant coating may be applied to the flexible strip prior to attaching the flexible strip to at least one of the corrosion coating of the fuel tank and the surface of the strap.

In yet another representation, an engine fuel tank assembly in a vehicle, is provided that comprises: a fuel tank; a strap at least partially surrounding the fuel tank and including a first end and a second end that are each attached to a discrete portion of the vehicle; and a first flexible strip with an abrasion resistant coating including polyurea positioned on a first side of a substrate and an adhesive positioned a second side of the substrate; where the first flexible strip is interposed between a surface of the strap and the corrosion coating of the fuel tank; and where the fuel tank and/or the strap includes a corrosion coating on an exterior surface.

In any of the aspects or combinations of the aspects, the system may be an engine fuel tank assembly included in a vehicle and where the first component is a fuel tank, a battery, or an engine component in an engine compartment and the second component is a strap coupled to a portion of the vehicle.

In any of the aspects or combinations of the aspects, the first flexible strip may include an adhesive layer attached to at least one of the corrosion coating of the first component and the surface of the second component.

In any of the aspects or combinations of the aspects, the adhesive layer and the abrasion resistant coating may be positioned on opposing sides of a substrate of the first flexible strip.

In any of the aspects or combinations of the aspects, the abrasion resistant coating may be applied to the first flexible strip prior to attaching the first flexible strip to at least one of the first component or the second component.

In any of the aspects or combinations of the aspects, the copolymer may include polyurea.

In any of the aspects or combinations of the aspects, the first flexible strip may extend across at least one edge of the first component.

In any of the aspects or combinations of the aspects, the system may further comprise a second flexible strip spaced away from the first flexible strip and attached the first component or the second component.

In any of the aspects or combinations of the aspects, the second component may be constructed out of a metal material and/or where the first component is constructed out of a polymeric material.

In any of the aspects or combinations of the aspects, the first flexible strip may include an adhesive layer attached to at least one of the corrosion coating of the fuel tank and the surface of the strap.

In any of the aspects or combinations of the aspects, the first flexible strip may extend across at least one edge of the fuel tank.

In any of the aspects or combinations of the aspects, where the engine fuel tank assembly further comprises a second flexible strip spaced away from the first flexible strip and attached the fuel tank or the strap.

In any of the aspects or combinations of the aspects, the strap may be constructed out of a metal material.

In any of the aspects or combinations of the aspects, the fuel tank may be constructed out of a polymeric material.

In any of the aspects or combinations of the aspects, the strap may be coupled to a vehicle frame.

In any of the aspects or combinations of the aspects, at least one of the fuel tank and the strap may be constructed out of a metal material.

In any of the aspects or combinations of the aspects, the engine fuel tank assembly may further include a second flexible strip spaced away from the first flexible strip and where the first and second flexible strips are positioned at two discrete corners of the strap.

In any of the aspects or combinations of the aspects, the corrosion coating may include an electrophoretic paint In another representation, a fuel delivery system is provided that includes a fuel tank supply fuel to an engine; at least one strap securing the fuel tank to a portion of a vehicle; and two or more flexible strips positioned in discrete locations on an exterior surface of a housing of the fuel tank and/or a surface of the strap; where the flexible strip is coated on at least one side with polyurea.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a first component;
a second component securing the first component to a portion of the system; and
a first flexible strip with an abrasion resistant coating, including a copolymer, and adhered to one or more of the first component and the second component;
wherein the first component and/or the second component includes a corrosion coating on an exterior surface; and
wherein the first flexible strip is interposed between the first component and the second component and the first component is spaced away from the second component by the first flexible strip.

2. The system of claim 1, where the system is an engine fuel tank assembly included in a vehicle and where the first component is a fuel tank, a battery, or an engine component in an engine compartment and the second component is a strap coupled to a portion of the vehicle.

3. The system of claim 1, where the first flexible strip includes an adhesive layer attached to at least one of the corrosion coating of the first component and the surface of the second component.

4. The system of claim 3, where the adhesive layer and the abrasion resistant coating are positioned on opposing sides of a substrate of the first flexible strip.

5. The system of claim 3, where the abrasion resistant coating is applied to the first flexible strip prior to attaching the first flexible strip to at least one of the first component or the second component.

6. The system of claim 1, where the copolymer includes polyurea.

7. The system of claim 1, where the first flexible strip extends across at least one edge of the first component.

8. The system of claim 1, further comprising a second flexible strip spaced away from the first flexible strip and attached the first component or the second component.

9. The system of claim 1, where the second component is constructed out of a metal material and/or where the first component is constructed out of a polymeric material.

10. An engine fuel tank assembly in a vehicle, the engine fuel tank assembly comprising:
a fuel tank;
a strap at least partially surrounding the fuel tank and including a first end and a second end that are each attached to a discrete portion of the vehicle; and
a first flexible strip with an abrasion resistant coating including polyurea positioned on a first side of a substrate and an adhesive positioned a second side of the substrate;
wherein the first flexible strip is interposed between the strap and the fuel tank, and the strap is spaced away from the fuel tank by a thickness of the first flexible strip; and
where the fuel tank and/or the strap includes a corrosion coating on an exterior surface.

11. The engine fuel tank assembly of claim 10, where the abrasion resistant coating is applied to the first flexible strip prior to attaching the first flexible strip to at least one of the corrosion coating of the fuel tank and the surface of the strap.

12. The engine fuel tank assembly of claim 10, where at least one of the fuel tank and the strap are constructed out of a metal material.

13. The engine fuel tank assembly of claim 10, further comprising a second flexible strip spaced away from the first flexible strip and where the first and second flexible strips are positioned at two discrete corners of the strap.

14. The engine fuel tank assembly of claim 10, where the corrosion coating includes an electrophoretic paint.

15. The engine fuel tank assembly of claim 10, where the strap is coupled to a vehicle frame.

* * * * *